Dec. 9, 1941.   W. P. LLOYD   2,265,975
PHOTO-COPY MACHINE
Filed March 10, 1941   12 Sheets-Sheet 2
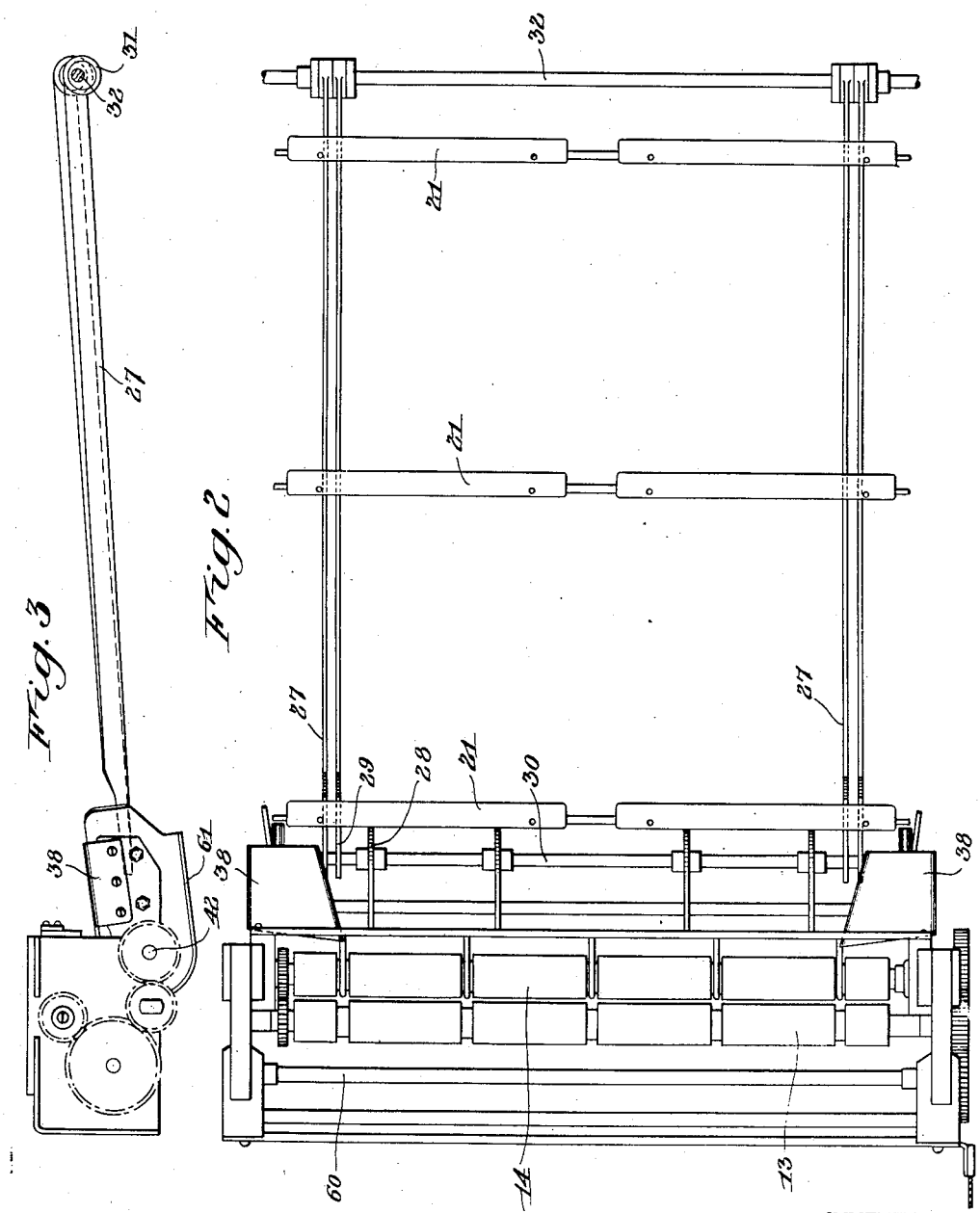
INVENTOR.
Whitten P. Lloyd
BY Harold E. Stonebraker
his Attorney

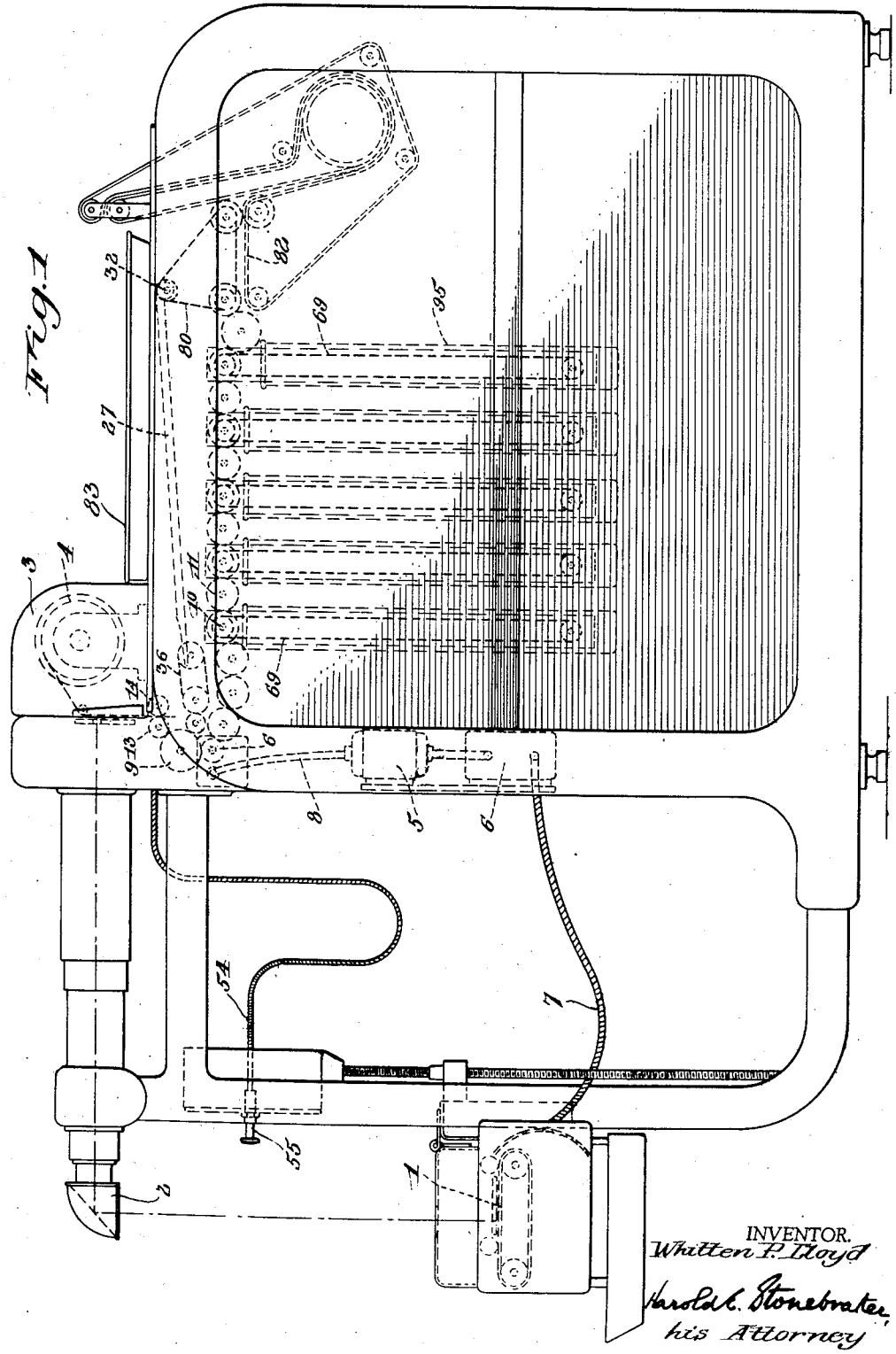

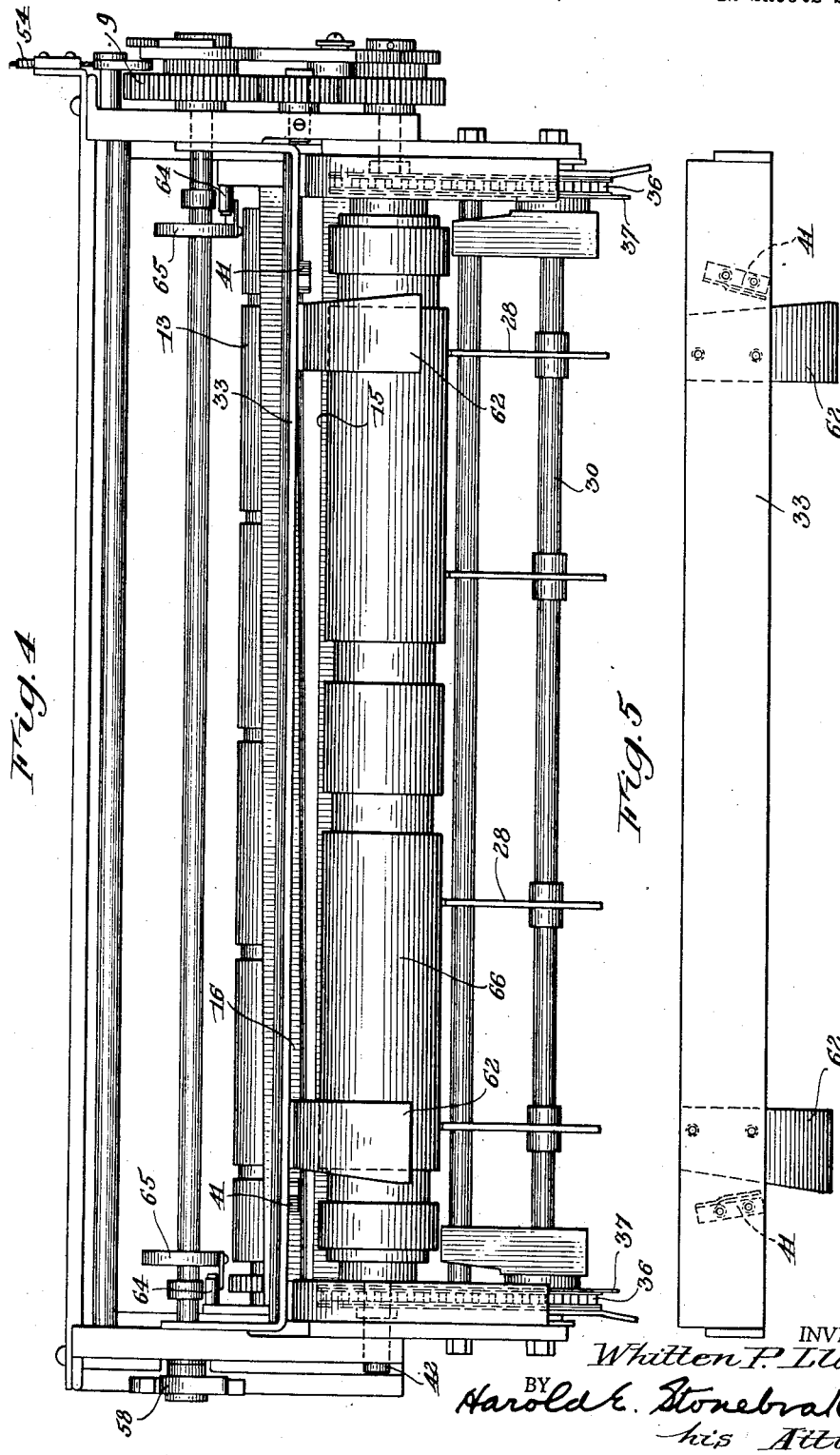

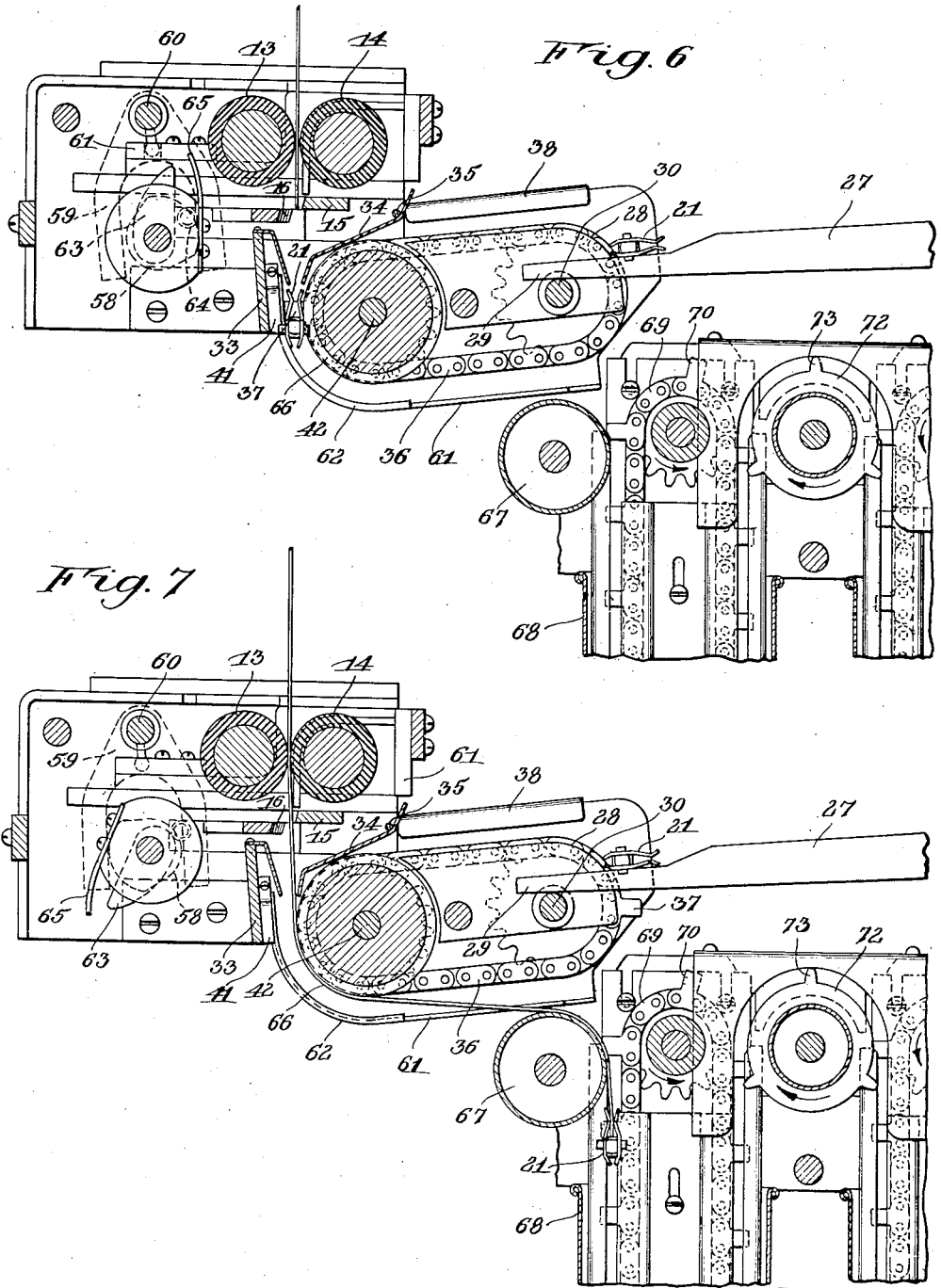

Dec. 9, 1941.  W. P. LLOYD  2,265,975
PHOTO-COPY MACHINE
Filed March 10, 1941  12 Sheets-Sheet 5
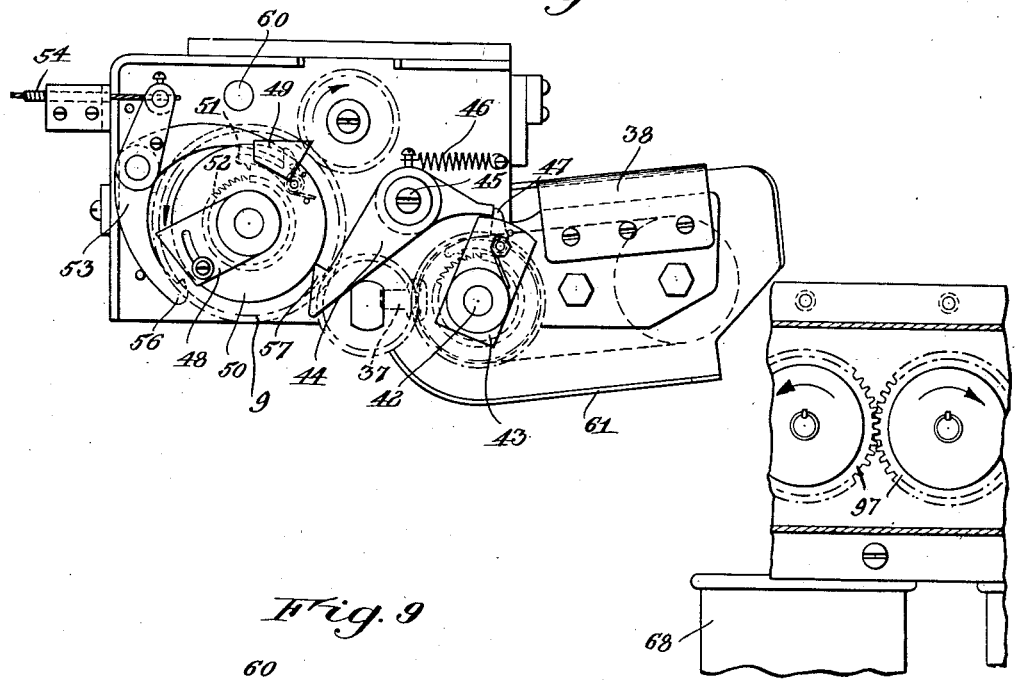
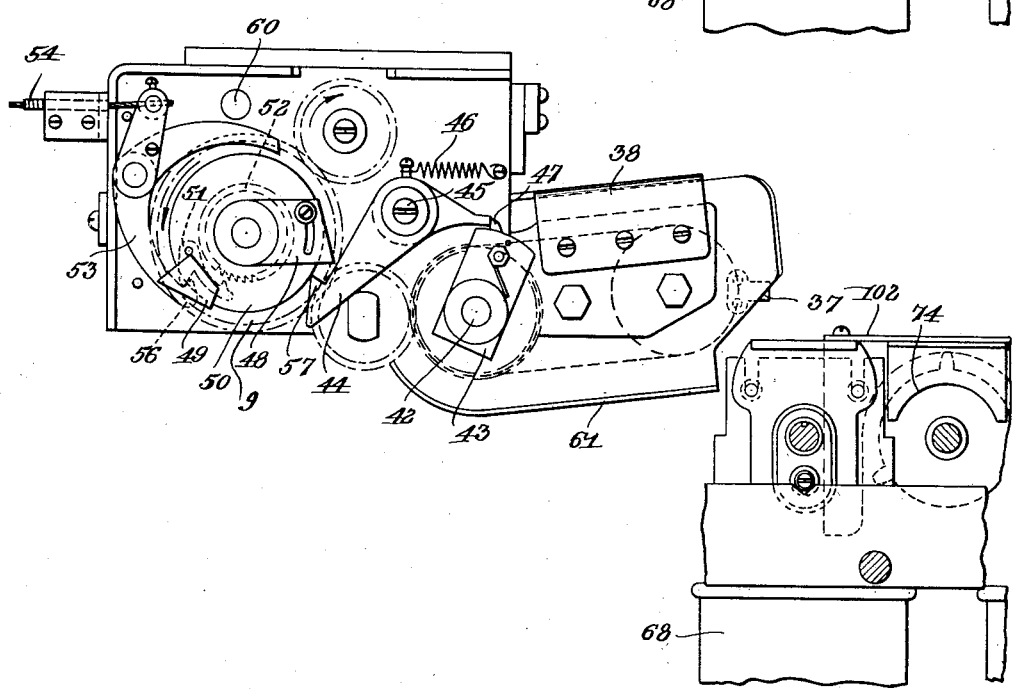
INVENTOR.
Whitten P. Lloyd
BY Harold E. Stonebraker,
his Attorney Dec. 9, 1941.  W. P. LLOYD  2,265,975
PHOTO-COPY MACHINE
Filed March 10, 1941  12 Sheets-Sheet 6

INVENTOR.
Whitten P. Lloyd
BY Harold E. Stonebraker,
his Attorney

Dec. 9, 1941.  W. P. LLOYD  2,265,975
PHOTO-COPY MACHINE
Filed March 10, 1941   12 Sheets-Sheet 7

Dec. 9, 1941.  W. P. LLOYD  2,265,975
PHOTO-COPY MACHINE
Filed March 10, 1941   12 Sheets-Sheet 8
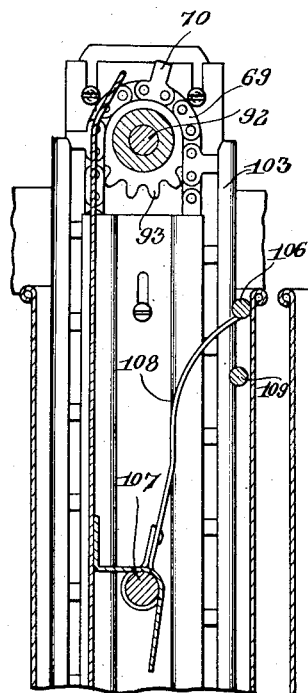
Fig. 13
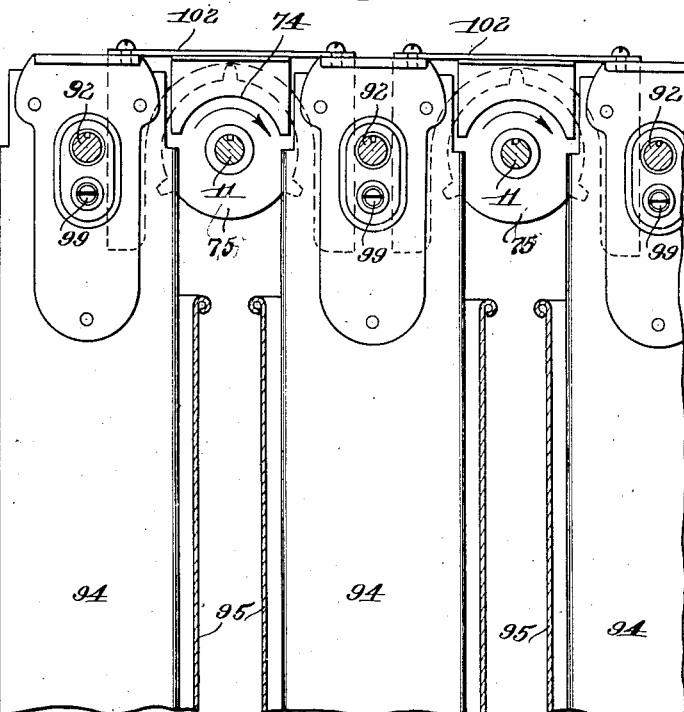
Fig. 14
Fig. 15
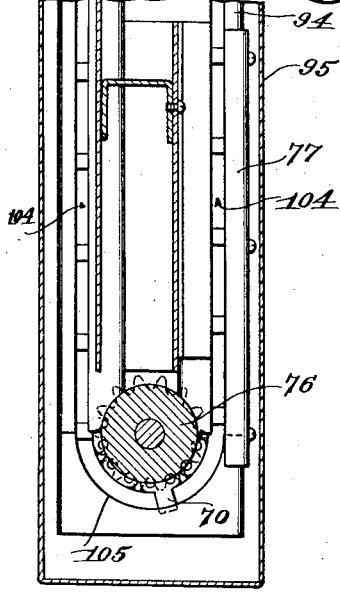
INVENTOR.
Whitten P. Lloyd
BY Harold E. Stonebraker
his Attorney Dec. 9, 1941.  W. P. LLOYD  2,265,975
PHOTO-COPY MACHINE
Filed March 10, 1941  12 Sheets-Sheet 9

INVENTOR.
Whitten P. Lloyd
BY Harold E. Stonebraker,
his Attorneys

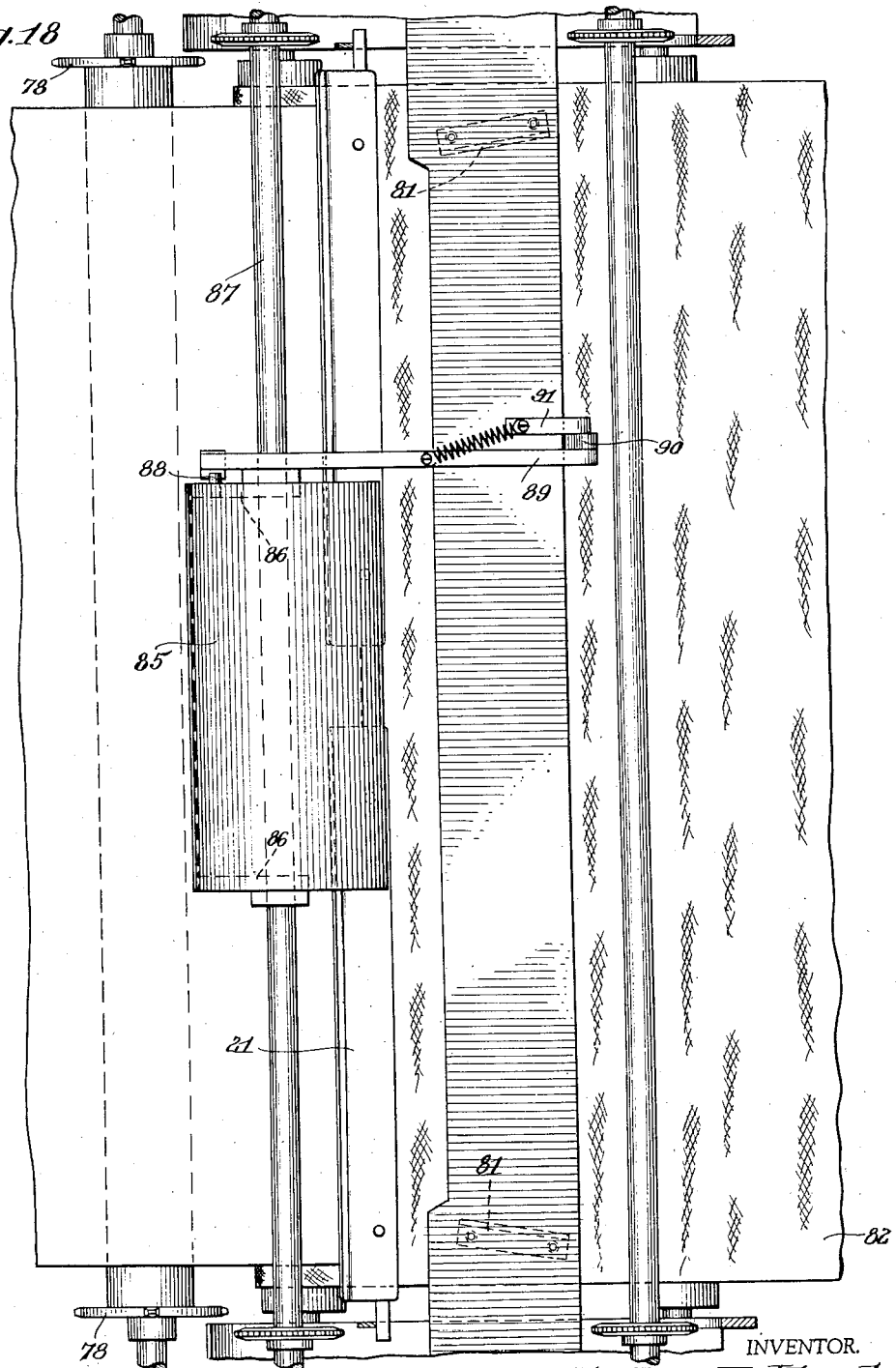

Dec. 9, 1941.   W. P. LLOYD   2,265,975
PHOTO-COPY MACHINE
Filed March 10, 1941   12 Sheets-Sheet 11
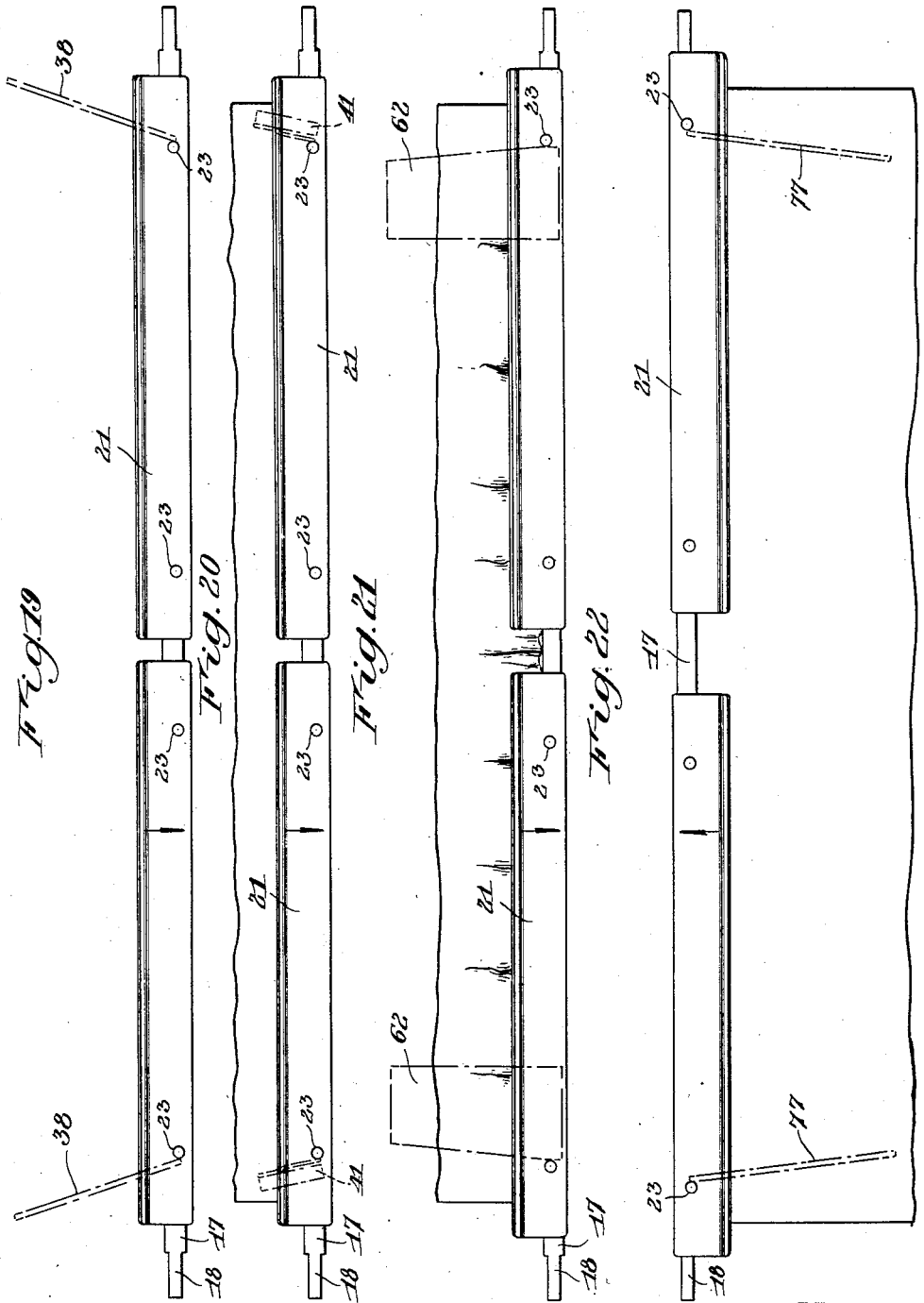
INVENTOR.
Whitten P. Lloyd
BY Harold E. Stonebraker
his Attorney Dec. 9, 1941.  W. P. LLOYD  2,265,975
PHOTO-COPY MACHINE
Filed March 10, 1941     12 Sheets-Sheet 12
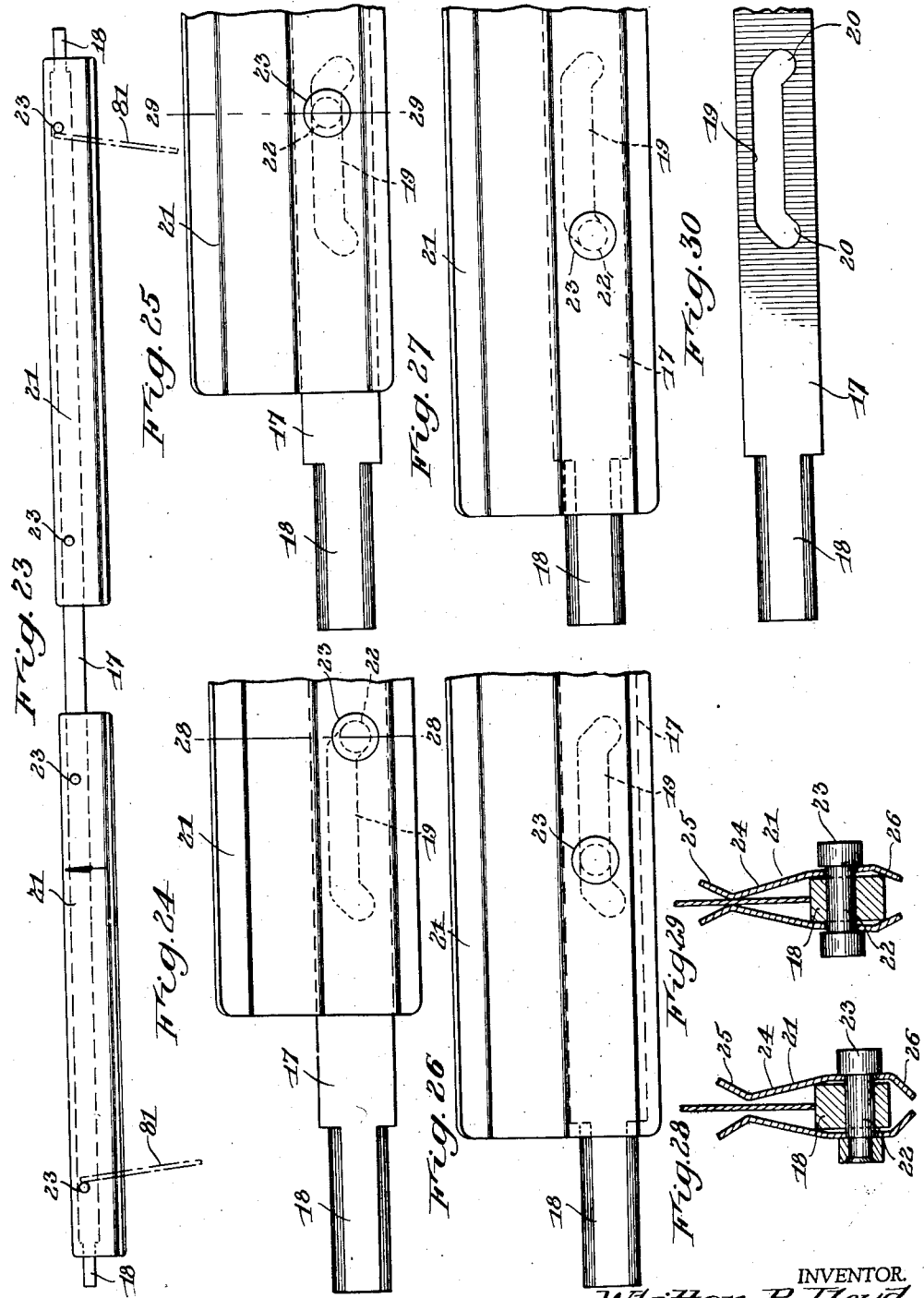

Patented Dec. 9, 1941

2,265,975

UNITED STATES PATENT OFFICE 2,265,975

PHOTO-COPY MACHINE

Whitten P. Lloyd, Rochester, N. Y., assignor to The Halold Company, Rochester, N. Y., a corporation of New York Application March 10, 1941, Serial No. 382,486

32 Claims. (Cl. 95—94)

This invention relates to a photo-copy machine, with more particular reference to the type of apparatus in which paper is exposed and processed by developing, fixing, and washing in the same machine, and it has for its purpose to afford a practical and efficient mechanism of this character in which the paper can be continuously exposed and continuously processed without interruption, or exposed and processed in any desired lengths, the paper being cut after the required length has been fed to the processing apparatus.

In machines of this general character operating with continuous exposure, there have been no facilities for continuous processing, and while some machines have been available that expose different lengths of paper and carry the paper through processing apparatus, such machines have been limited in their application to definite predetermined lengths of paper determined by the distance between adjacent sets of paper engaging pins that are usually mounted on an endless chain which carries the paper through the processing receptacles, but it has not been possible with such machines to expose and immediately process in the same machine a continuous strip of paper of indefinite length, and it is a particular object of the invention to afford a structure that will accomplish this objective with a relatively simple mechanism of few parts, or will permit the processing of any shorter strips of paper cut for example from ten to fifteen feet in length, and which will handle the paper smoothly, effectively and speedily.

A further purpose of the invention is to provide a structure of this general type having a series of processing tanks or receptacles with a separate conveyor in each receptacle instead of running one continuous conveyor through all the receptacles, thus avoiding excessive transfer of liquid from one receptacle to another, and affording a simpler mechanism which is less likely to need attention and can be serviced and cleaned more easily.

Another object of the invention is to afford a machine for the purpose mentioned in which relatively deep processing tanks can be employed, without lessening the efficiency or practicability of the machine, thus greatly reducing the floor space required for the apparatus, and increasing its economy both in cost of manufacture and in facility of operation.

A further purpose of the invention is to afford a structure that employs separate and independently movable paper gripping devices instead of having pins or other instrumentalities permanently mounted on an endless chain or the like, one of the paper gripping devices being selectively moved into position to receive the forward edge of the paper sheet as the latter starts to move, after which the paper gripping device clampingly engages the paper sheet and moves therewith to the processing apparatus and successively through the several tanks, from the conveyor of one tank to the conveyor of another, thus enabling the use of separate and removable conveyor supports in each tank and making it possible to clean and service the different parts of the apparatus more readily and effectively.

Another object of the invention is to afford a mechanism including simple and efficient form of paper gripping device that is economical to manufacture, durable, and which can be easily moved under the control of an operator into the path of the paper, which automatically grips the paper as the latter is fed to carry it to the processing apparatus, automatically takes up the paper to compensate for stretching after it becomes wet in the first processing tank, which automatically releases the paper after the latter leaves the processing tanks, and is then automatically returned to loading position for a repetition of the operation.

A further purpose of the invention is to afford in connection with such a paper gripping device a control mechanism that operates automatically under the control of an operator to select one of the paper gripping devices and move it from loading position to initial feeding position immediately after a length of paper has been cut, where it remains until the next succeeding operation, the control mechanism again functioning when the paper feeding mechanism is operated to move the paper gripping device from said initial feeding position to the processing tanks, during which movement the paper gripping device is automatically clampingly engaged with the paper and travels with the latter through the several processing tanks, after which it is released and returned to loading position.

To these and other ends, the invention consists in the construction and arrangement of parts that will appear clearly from the following description when read in conjunction with the accompanying drawings, the novel features being pointed out in the claims following the specification.

In the drawings:

Fig. 1 is a general view in side elevation showing a photo-copy machine constructed in accordance with a preferred embodiment of the invention;

Fig. 2 is an enlarged plan view of a portion of the machine showing the paper feeding mechanism and the parts for returning the paper gripping devices to loading position, one of the paper gripping devices being shown in loading position ready to be moved therefrom to initial feeding position;

Fig. 3 is a side elevation of the parts illustrated in Fig. 2;

Fig. 4 is a bottom plan view of a portion of the structure illustrated in Fig. 2, showing the paper cutting mechanism, feeding mechanism, and associated parts for controlling movement of the paper gripping devices;

Fig. 5 is an enlarged detail view in elevation showing the cam guides which control the paper gripping device while in initial feeding position and during its movement to the processing mechanism;

Figure 10:
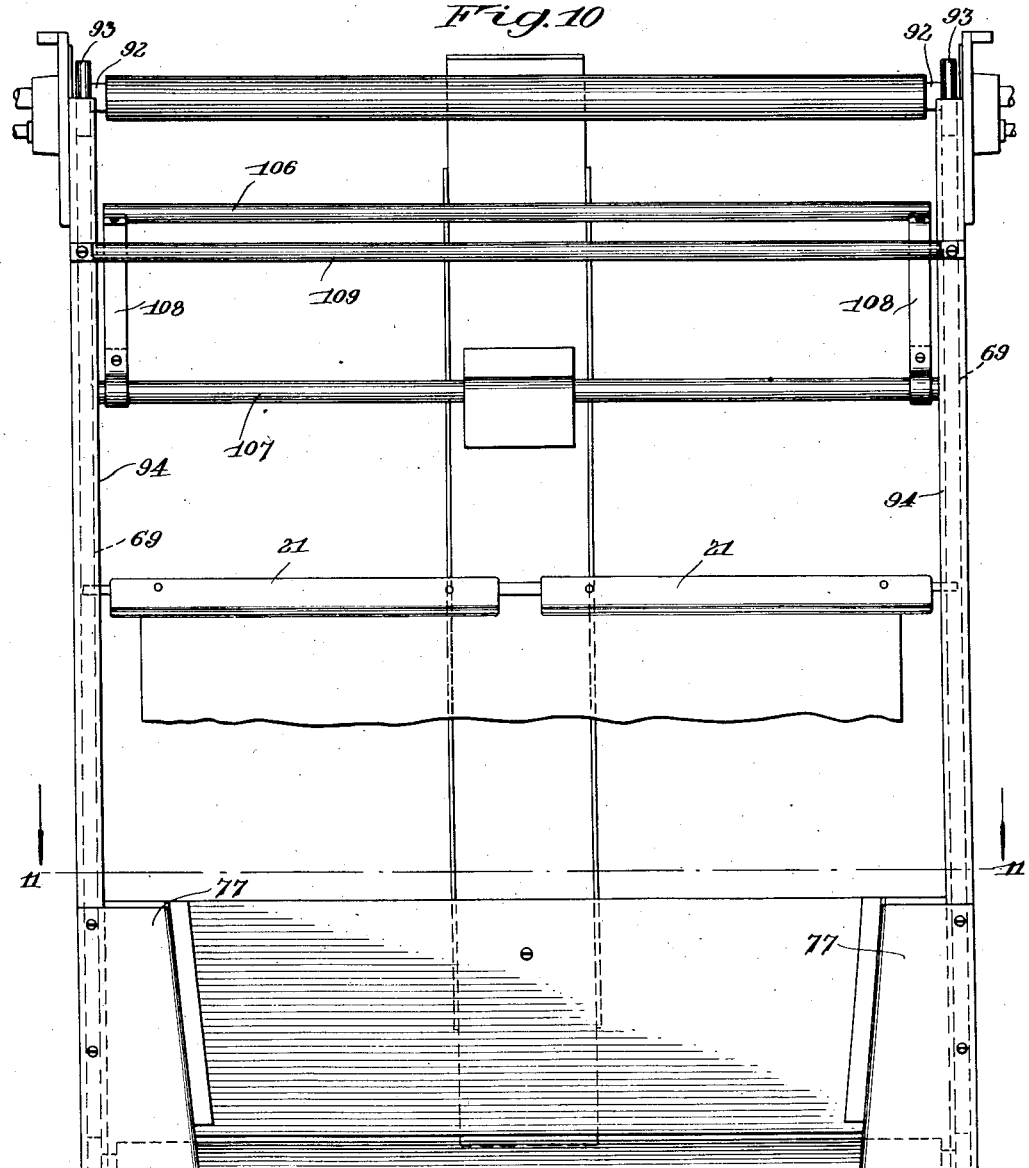
Figure 11:
Figure 12:
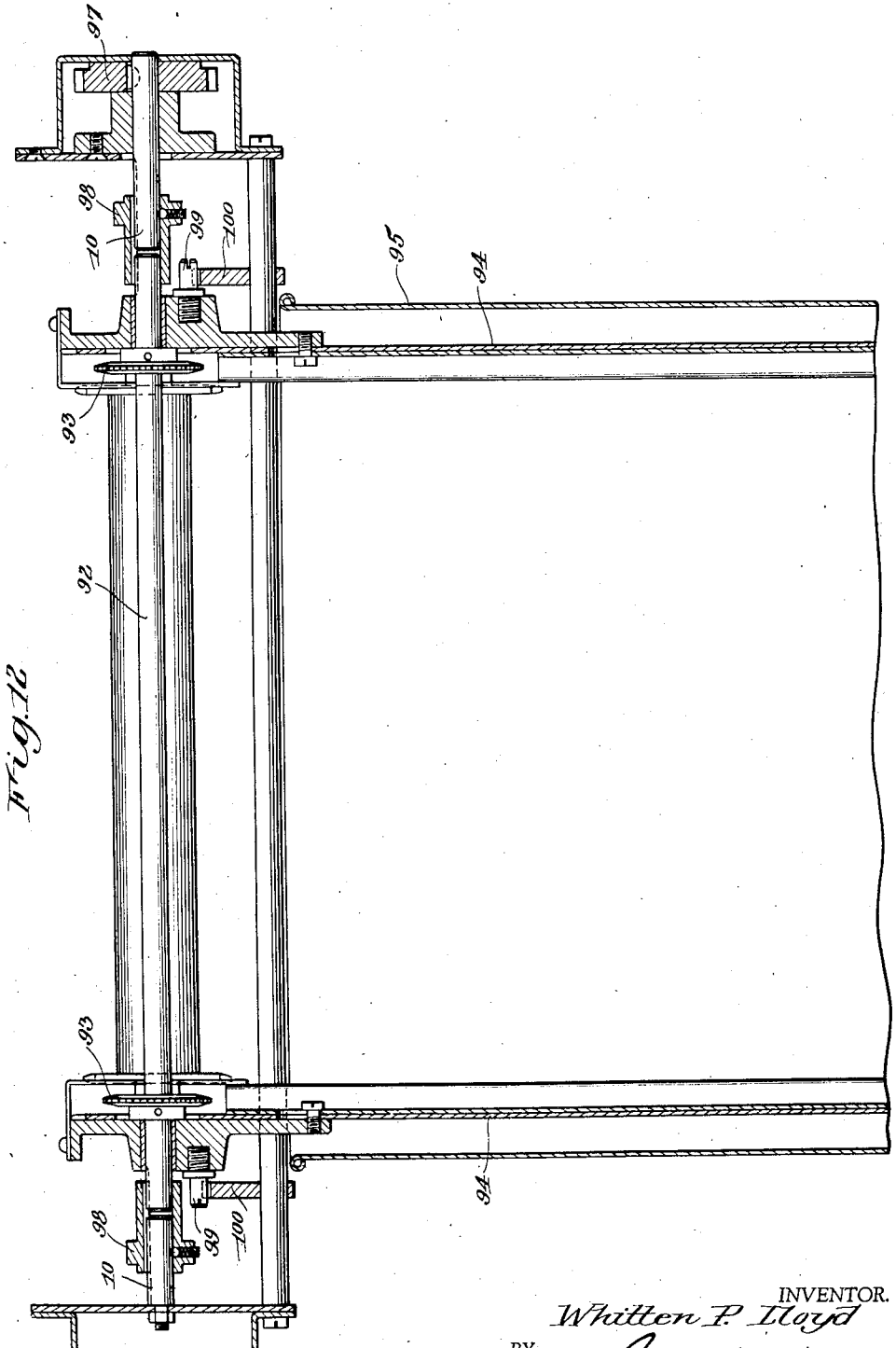
Figure 16:
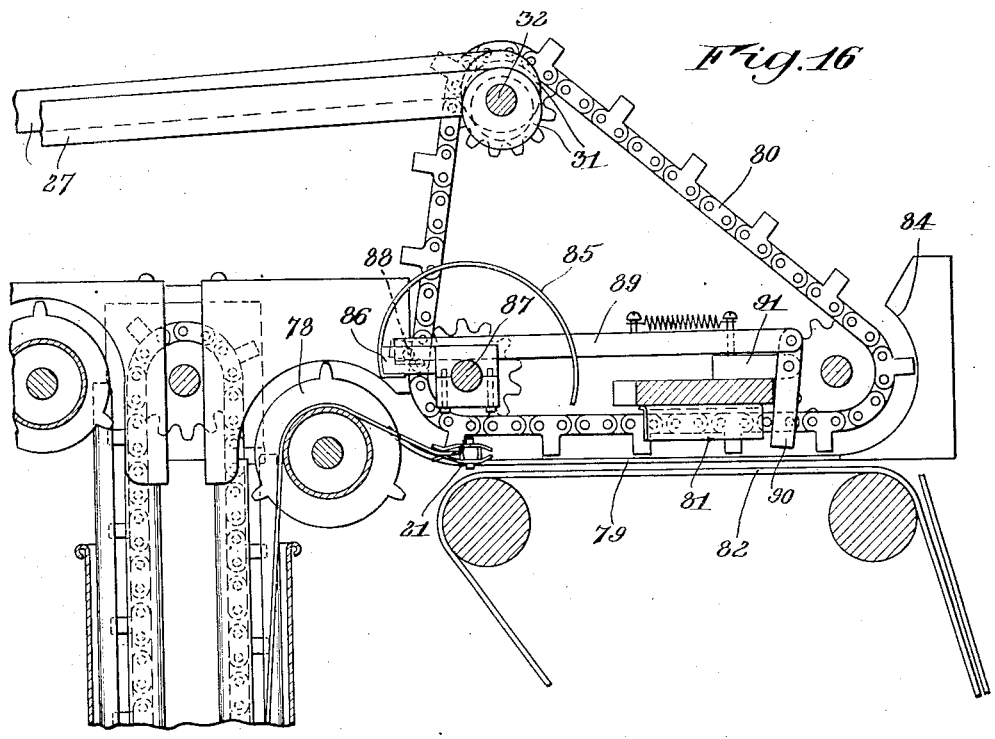
Figure 17:
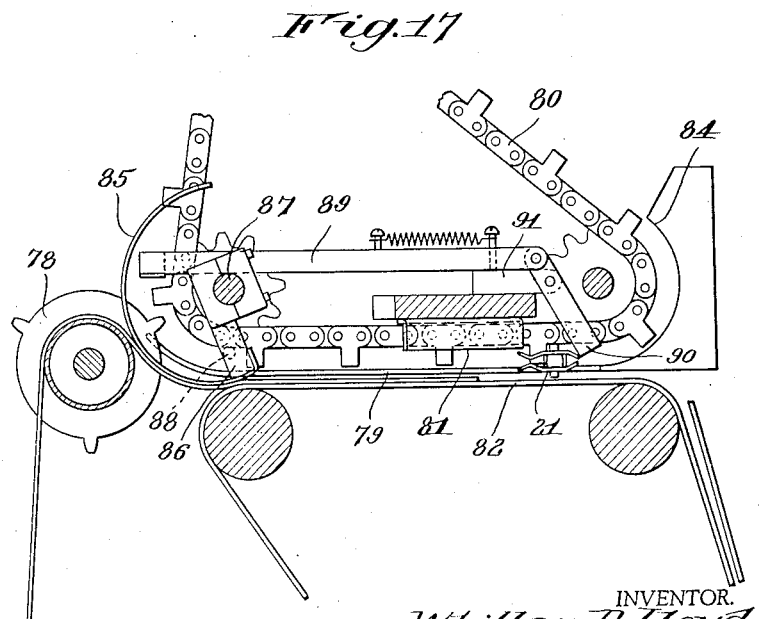

Fig. 6 is an enlarged detail sectional view showing in end elevation the paper feeding mechanism in idle position, the paper cutting mechanism, the starting conveyor which moves a paper gripping device from loading position to initial feeding position in one cycle and from initial feeding position to the processing tanks in a second cycle, and a portion of the processing tanks, one paper gripping device being illustrated in this figure in initial feeding position with the clamping plates open to receive the edge of the paper when the latter is fed downwardly;

Fig. 7 is a similar view showing the position of the parts after the paper feeding mechanism has commenced to operate and the paper gripping device has been moved downwardly, having been brought into clamping engagement with the forward edge of the paper sheet and traveled with it into the developing tank;

Fig. 8 is an enlarged detail sectional view showing in end elevation the mechanism for controlling the movement of the starting conveyor, the paper feeding mechanism, and the paper cutting mechanism, with the parts in position of rest, the paper feeding mechanism being idle and the starting conveyor ready to move a paper gripping device downwardly from its initial feeding position;

Fig. 9 is a similar view showing the position of the parts necessary to effect movement of the starting conveyor through its first cycle, to move the paper gripping device from initial feeding position to the processing mechanism, while the paper feeding mechanism is operating;

Fig. 10 is a view in side elevation of one of the removable conveyor supports, one of which is in each tank, showing the relative position of a paper gripping device as it travels therethrough;

Fig. 11 is a horizontal sectional view on line 11—11 of Fig. 10, with parts in elevation;

Fig. 12 is a longitudinal vertical sectional view through one of the tanks and its removable conveyor support, showing the connection between the removable conveyor and the drive mechanism;

Fig. 13 is a transverse vertical sectional view of the same;

Fig. 14 is a partial side elevation of a portion of the processing tanks, showing the mechanism for moving a paper gripping device from the conveyor of one tank to another;

Fig. 15 is a detail perspective view;

Fig. 16 is an enlarged detail side elevation showing a portion of the final processing tank and the mechanism for returning the paper gripping device after it is released from the paper, and for feeding the paper to the drier mechanism;

Fig. 17 is a similar view, with parts broken away, showing the position of the parts after the paper feeding member has moved to assist travel of the paper from the last tank to the drier mechanism;

Fig. 18 is a plan view of part of the mechanism illustrated in Fig. 16, showing the means for assisting movement of the paper on to the conveyor belt of the drier mechanism after the paper gripping device is released;

Fig. 19 is a view in side elevation of one of the paper gripping devices showing it in released position, and the relation of the cam guides which effect movement of the clamping plates to releasing position, the arrow indicating the relative direction of movement of the paper gripping device;

Fig. 20 is a similar view showing the relation of the cam guides which yieldingly maintain the clamping plates in released position while in initial feeding position to receive the paper;

Fig. 21 is a similar view showing the position of the clamping plates after they have been moved outwardly along the bar and toward each other laterally to engage the edge of the paper and grip it during the movement from initial feeding position to the first processing tank;

Fig. 22 is a similar view showing the position of the clamping plates after the paper gripping device has reached the first processing tank, the clamping plates having been moved farther outwardly toward the ends of the bar to draw the paper taut laterally of the sheet and thus compensate for any stretching after entering the liquid in the tank;

Fig. 23 is a view similar to Fig. 22 showing the position of the clamping plates and the cam guides after the plates have been moved to their extreme outermost positions to release the paper subsequent to the movement of the paper gripping device from the last processing tank, to permit return of the paper gripping device to its loading position and movement of the paper into the drier mechanism;

Fig. 24 is an enlarged elevation of one end of the paper gripping device partially broken away, showing the relative position of the supporting bar and clamping plates when the latter are in released position, and the controlling pin at the inner end of the cam slot in the bar;

Fig. 25 is a similar view showing the position of the same parts when the plates and controlling pin have been moved slightly toward the end of the bar to bring the pin into contact with the straight portion of the cam slot to move the plates into clamping relationship with each other;

Fig. 26 is a view similar to Fig. 25 with the clamping plates moved farther endwise of the bar and the pin having moved along the straight portion of the cam slot, but still in engagement therewith and maintaining the clamping plates in gripping relation with the paper;

Fig. 27 is a view similar to Fig. 26, showing the position of the parts when the clamping plates have moved endwise of the bar to their extreme outermost positions, with the pin in the outer end of the cam slot and the clamping plates released;

Fig. 28 is an enlarged sectional view on line

28—28 of Fig. 24, showing the clamping plates released;

Fig. 29 is a similar view on line 29—29 of Fig. 25, showing the clamping plates moved toward each other with their gripping portions engaging a sheet of paper, and Fig. 30 is an enlarged detail view in elevation of a portion of one of the supporting bars on which the clamping plates are mounted.

Referring more particularly to the drawings, in which like reference numerals refer to the same parts throughout the several views, and to Fig. 1, 1 designates a continuously traveling copy support, 2 is the conventional prism, and 3 the paper magazine within which is supported the roll 4 of light sensitive photographic paper such as used for photo-copy purposes, the paper being fed and exposed as usual in this type of apparatus.

The movable copy support is operated from an electric motor 5 through a suitable speed-change gearing indicated at 6 and flexible shaft 7, and 8 designates a flexible shaft leading from the motor 5 and supplying power to the drive member 9 from which movement is imparted through suitable gearing to the continuously rotating shafts 10, one in each processing tank or receptacle, to the intermediate shafts 11 between the processing tanks, to the continuously rotating paper feed rolls 13 and 14, and to the other rotating parts, said drive member 9 also serving to operate the paper cutting mechanism, the starting conveyor for the paper gripping device, and to move the paper feed rolls into operative relationship subject to manual control of the operator in a manner that will appear more clearly presently.

The paper feed rolls 13 and 14 are constantly rotating and under the control of the operator so that they may be moved together to feed paper at any time or may be separated to stop the paper feed, and likewise the paper cutting mechanism involving a stationary knife 15 and movable knife 16, see Fig. 6, may be operated at any time to cut a sheet of paper of any required length when a given operation is to be terminated. In order to maintain the paper taut and feed it properly through the processing tanks, paper gripping devices are provided which are separate and independently movable and each adapted to clamp the forward edge of the paper sheet and to carry the latter through the several processing tanks for developing, fixing, and washing.

When a particular exposure operation is completed and the cutting mechanism is operated to sever the paper, the paper feeding rolls are separated at the same time to stop the feed of additional paper, and one of the paper gripping devices is automatically moved from a loading position into an initial feeding position in the path of the paper, where it remains stationary until the operator again starts feeding of the paper. Upon the next paper feeding operation, the paper initially moves into engagement with the paper gripping device and thereupon the paper gripping device moves with the paper to the processing tanks, the paper gripping device being automatically brought into clamping engagement with the paper during said movement. The paper gripping device continues to maintain and feed the forward edge of the paper sheet through the processing tanks, after which the paper gripping device is released from the paper and returned to its stationary loading position and the paper travels on through a drier mechanism, and a fresh paper gripping device is not presented into feeding position in the path of the paper until the length of paper traveling through the processing apparatus has been severed. Consequently a continuous sheet of any indefinite length may be exposed and carried through the processing apparatus, or exposed sheets of any desired short lengths may be processed and severed, the length of sheet fed being determined by the operator who may operate the paper cutting mechanism and stop the feed at any time. The construction and operation of the individual paper gripping device will first be described, as this is essential to an understanding of the manner in which the paper is clamped and fed through the apparatus.

Referring to Figs. 19 to 30 inclusive, each paper gripping device is adapted to extend laterally across the paper sheet and to grip its forward edge, and to this end includes a supporting bar 17 having reduced ends 18 which engage suitable tracks for guidance through the machine and which in turn are engaged by conveyor lugs for propelling the paper gripping device along. The bar 17 is provided with cam slots, each including a straight portion 19 and curved portions or recesses 20 at the ends thereof, and mounted on the bar 17 are two pairs of clamping plates, one pair on each side of the longitudinal center of the bar.

Each pair of clamping plates designated at 21 is held on the supporting bar 17 by pins 22 extending through openings in the clamping plates 21 and through the cam slot previously mentioned. The pins 22 have heads or enlarged ends 23 which engage the outer surfaces of the clamping plates and maintain them loosely on the bar to permit the necessary endwise and lateral movement that is required. Each clamping plate includes an inwardly inclined gripping portion 24 with an outwardly extending extremity 25, and an inwardly inclined rear portion 26 which acts as a cam surface and engages the adjacent edge of the supporting bar when relative lateral movements between these parts is effected. When the pins 22 are in the ends or recesses 20 of the cam slots, as shown in Figs. 24 and 27, the clamping plates are separated, as indicated in Fig. 23, to permit movement of a paper sheet therebetween, and when the clamping plates and pins are moved endwise of the supporting bar, to bring the pins into contact with the straight portion 19 of the cam slot, as shown in Fig. 25, a relative lateral movement between the clamping plates and supporting bar is effected, as shown in Fig. 29, the bar camming the rear portions 26 of the clamping plates outwardly and bringing their gripping portions 24 together to engage and grip a sheet of paper.

In this fashion, the paper gripping devices are controlled through the instrumentality of suitable cam guides located in their path of travel at proper points in the machine to open the clamping plates when in initial feeding position to receive a sheet of paper, thereafter to close the clamping plates and grip the paper during the movement from initial feeding position to the first processing tank, subsequently to move the two pairs of clamping plates farther outwardly toward the ends of the supporting bar while in the first processing tank while still maintaining the plates in clamping relation to compensate for stretching of the paper after it becomes wet, and finally to release the paper sheet after it leaves the last processing receptacle. The paper gripping device is then returned to loading position ready for a repetition of the operation and the paper is carried on to the drier mechanism.

Fig. 19 shows the initial position of the clamping plates on their supporting bar and a diagrammatic illustration of the cam guides which engage the pins to move the clamping plates endwise toward the center of the bar to separate them, and Fig. 20 shows a similar position of the clamping plates and the cam guides which yieldably maintain the plates spread to receive the paper when in initial feeding position. Fig. 21 shows the position of the clamping plates and controlling cam guides for moving them to grip the paper and carry it to the processing mechanism, and Fig. 22 illustrates the position of the clamping plates and controlling cam guides when the clamping plates are moved farther along the supporting bar while still in clamping relation, to draw the paper taut laterally and compensate for its stretching when wet. Fig. 23 shows the position of the clamping plates and controlling cam guides when the plates are separated to release the paper sheet after the processing operation is completed and the paper is ready to move to the drier mechanism, the movement of the paper gripping device with reference to the controlling cam guides being illustrated by the arrows in the figures just referred to.

Any convenient number of paper gripping devices such as just described may be employed, these being normally stationary in loading position as shown in Fig. 2, where one of the paper gripping devices is illustrated as supported on walking beams 27 at the forward ends of the latter and resting against the tracks 28. Other paper gripping devices are illustrated at different positions during their return on the walking beams 27, the forward ends 29 of which are supported on the rod 30. The walking beams 27 are operated by eccentrics 31 on the rotating shaft 32 and effect return of the paper gripping devices to loading position after they have been through the processing tanks and released from the paper, as will appear later.

Referring to Fig. 6, in which the paper is illustrated in idle position with the feed rolls being separated, a paper gripping device is shown in initial feeding position in the path of the paper with its clamping plates open to receive the paper and located just under the paper chute which includes a stationary side wall 33 and the opposite movable side wall 34 that is carried on the rocking support 35 to permit the chute wall 34 to lift when the paper gripping device is fed thereunder from loading position to the initial feeding position shown.

This movement of the paper gripping device, which has already taken place in Fig. 6, is accomplished by a starting conveyor including chains 36 which are provided with lugs or projections 37 so located on the starting conveyor that when the latter is operated during one cycle, the projections 37 engage the ends 18 of the supporting bar of the paper gripping device located adjacent to the tracks 28, Fig. 2, and move the same upwardly over the tracks 28 and under the movable chute wall 34, the starting conveyor coming to rest with the paper gripping device in the position shown in Fig. 6. During the last described cycle of movement of the paper gripping device, the pins 22 of the latter are engaged by cam guides 38, see Fig. 2, to move the clamping plates endwise of the supporting bar and inwardly thereof toward the center to extreme releasing position, the clamping plates being held in such releasing position when the paper gripping device is in the initial feeding position of Fig. 6 by means of yieldable cam guides 41, see Figs. 4 and 5, which serve to hold the clamping plates open while the paper is fed between the same.

The starting conveyor 36 has two cycles of movement, traveling through half of its path in each cycle, the first cycle of movement operating to carry a paper gripping device to the position just described, and the next cycle operating to move the paper gripping device from the initial feeding position to the first processing tank where it is picked up and carried on by the conveyors in the processing tanks successively. The last mentioned movement of the paper gripping device takes place immediately after the paper feeding mechanism commences to operate, while the first mentioned cycle of movement of the starting conveyor takes place immediately following the operation of the cutting mechanism, and the movement of the parts which effects these operations will now be described in more detail.

The starting conveyor 36 is driven from a shaft 42, see Fig. 6, which is operated intermittently by a clutch mechanism as follows. Mounted on the shaft 42, see Fig. 8, is a clutch plate 43 carrying a spring-controlled clutch that is permitted to engage a driving wheel which is continuously rotating, and normally held out of engagement therewith by means of a rock arm 44 pivoted on an arbor 45 and held in normal position by a spring 46, said rock arm engaging the projection 47 of the clutch on the clutch plate 43 to release the latter. When the rock arm 44 is actuated, the clutch is released, making a complete rotation and causing the starting conveyor to move through one cycle, the projections or lugs 37 moving either from the initial feeding position of Fig. 6 to a position half way around the path, or from such half-way position to the Fig. 6 position, as the case may be.

Movement of the rock arm 44 is effected by one or the other of two cams 48 and 49 carried upon a rotary plate 50 which also carries a spring-actuated clutch member 51 that is engaged and driven by a driving wheel 52. The clutch member 51 is released for engagement with the driving wheel 52 by means of a rocking lever 53 that is controlled by a flexible operating member 54, and 55 is a handle under the control of the operator by which the rocking lever 53 is operated to effect operation of the paper feeding mechanism or of the paper cutting mechanism whenever desired.

With the parts in the position shown in Fig. 8, the rocking lever 53 is engaged with the clutch member 51 and is holding the latter out of engagement with the driving wheel, the parts being then in idle position, and when the shaft 54 is pulled outwardly, rocking the lever 53 upwardly, it is disengaged from the clutch member 51 and the latter is permitted to drop into engagement with the driving wheel 52, causing rotation of the plate 50 until the nose 56 on the rocking lever reengages the clutch member and withdraws it, as shown in Fig. 9. During this movement, the cam 48 engages the nose 57 of the rock arm 44 and moves the same inwardly to release the starting conveyor for its first cycle of movement.

During this half rotation of the plate 50, the cam 58, see Fig. 6, swings the yoke 59 about its pivotal support 60, likewise moving the support 61 on which the paper feeding roll 14 is mounted toward the other roll and thus carrying the paper feeding roll into close engagement with the paper and starting to feed the latter. This movement of the paper feeding rolls and feeding of the paper takes place slightly in advance of the movement of the starting conveyor so that the paper moves downwardly into engagement with the paper gripping device, and when it has reached the position between the clamping plates, the starting conveyor starts to travel and carries the paper gripping device downwardly and laterally along the tracks 61 from which it is discharged into the first processing tank, as shown in Fig. 7, where it is engaged and carried on by the conveyor in the tank. During this last mentioned movement of the paper gripping device from initial feeding position, its pins are engaged by the cam guides 62, to move the clamping plates endwise of the supporting bar and thus grip the paper effectively so as to hold its forward edge and guide it into the first processing tank as the starting conveyor carries the paper gripping device to that position. When the starting conveyor has completed this cycle, it comes to rest and remains there until the operator wishes to cut the paper and stop the paper feeding whereupon he pushes the shaft 54 inwardly, swinging the nose 56 of the rocking lever 53 downwardly and again releasing the rotatable cam plate 50 to permit it to make another half turn, during which motion the cam 49 operates the rock arm 44 and permits the starting conveyor to go through another cycle and thereby to move a paper gripping device from loading position to the initial feeding position already described.

At the same time, and just prior to the last mentioned movement of the starting conveyor, the cutting mechanism is operated to cut the sheet of paper, and this is accomplished by means of a cam 63 that turns with plate 50, and engages the roller 64 on the movable knife support, causing the latter to travel laterally and engage the stationary knife to sever the paper sheet, the knife being returned to its initial position by means of the plate 65 rotatable with the cam 63 and engaging the roller 64. At the same time the movable feed roll 14 is withdrawn from feeding engagement with the paper and other feed roll by the cam 58, and the paper sheet remains idle until the next operation.

66 and 67 designate guide rolls around which the paper travels in passing from the feeding mechanism to the first processing tank 68 which contains the developing solution, and 69 designates a chain conveyor, located in each of the processing tanks and provided with lugs or projections 70 to engage the ends of the bar of the paper gripping device and carry it through the processing tank. The rotating shafts located between the tanks are provided with transfer wheels 72 having projections or lugs 73 that engage the paper gripping device at the ends and effect its movement from one tank to another, the paper gripping device being guided in such movement by means of curved walls 74, see Figs. 14 and 15, located between adjacent tanks and acting to divert the paper gripping device and likewise the paper from one tank to another, the paper being guided between adjacent tanks around a roll 75 and also around a roll 76 located at the bottom of each tank.

When the paper reaches the developer solution in the first tank, it becomes wet and therefore is caused to stretch somewhat, and to compensate for this and to maintain the paper in a smooth state as it travels through the processing tanks, the cam guides 77 are provided, see Fig. 10, which engage the pins on the clamping plates of the paper gripping device, moving the clamping plates from the position shown in Fig. 25 to the position shown in Fig. 26, and thereby drawing the paper from the position illustrated in Fig. 21 to that shown in Fig. 22. The clamping plates remain frictionally in any position to which they are adjusted, since the pins will retain any position along the straight portion of the cam slot, so that the clamping plates remain in the position last described throughout the entire travel of the paper gripping device through the processing tanks. When the paper gripping device leaves the last processing tank, see Figs. 1, 16 and 17, it is transferred by the wheels 78 on to tracks 79, where it is engaged and carried along by lugs on the conveyor 80, and when it reaches a point near the end of the track 79, the paper gripping device is automatically released from the paper by means of cam guides 81 engaging the pins on the clamping plates and moving the latter toward the ends of the supporting bar. The paper is then carried along on belt 82 to the drier mechanism through which it travels and is discharged into a pan or receptacle 83, while the paper gripping device is carried by conveyor 80 around the guides 84 and thence upwardly, see Fig. 16, being discharged at the upper end of the conveyor 80 on to the walking beams 27 already described, see Fig. 2, on which the paper gripping device is carried back to its loading position ready for another operation.

When the paper gripping device is released from the paper, it is desirable to assist the paper in its movement on the belt 82 to insure its being engaged by the cooperating belt and carried through the drier mechanism, and to accomplish this there is provided a feeding member, see Figs. 16 and 18, preferably in the form of a spiral or curved spring plate 85 that is carried by an arm 86 frictionally mounted on the rotating shaft 87 and normally held against movement by means of a suitable locking member 88 carried on a movable spring-actuated bar 89 which is normally in position to hold the friction drive member 85 against movement. The bar 89 carries a link 90 pivoted on a bracket 91 and located in the path of the paper gripping device so that when the latter travels along as it is released from the paper, it strikes link 90, rocking the latter and moving the bar 89 to release the friction member 85 which thereupon turns over slowly, making a complete rotation, and as it does so, it wipes against the paper and frictionally feeds the latter on to the belt 82, the friction member 85 being automatically locked when it has made one rotation and held in such restored position until another paper gripping device is released from a stretch of paper.

Referring to Figs. 10 and 12, the conveyor in each processing receptacle is mounted on a suitable supporting frame that is removable from the tank to permit access to the interior for cleaning and also to service the mechanism of the conveyor if necessary. To this end, each conveyor support comprises a suitable frame in which is mounted a shaft 92 carrying the sprocket wheels 93 over which the conveyor chains 69 travel, these parts being mounted on a support including side walls 94. 95 designates one of the stationary tanks or receptacles which may be of any desired depth, and 10 designates the previously mentioned shaft mounted in a stationary support and carrying a pinion 97 by which it is driven from the operating mechanism. 98 designates a slidable sleeve provided with a key engageable with the shaft 10 and also with the outer end of the shaft 92 on which the sprockets 93 are mounted, so that by sliding the sleeve 98 endwise, the conveyor within any particular tank may be released and removed therefrom. The conveyor support or frame carries pins 99 which preferably are located in notches in stationary supporting plates 100, the conveyor supports and guide members 74, see Fig. 14, being held in position by removable retaining plates 102 which are attached to a stationary portion at the top of the tank.

Referring to Figure 13, each conveyor support includes channels 103 which are slotted at 104 to receive the ends of the paper gripping devices as they travel downwardly and upwardly through the tank, while 105 designates a guide wall at the bottom for directing the course of the paper gripping device around the bottom of the tank from one side thereof to the other whence it is carried upwardly by the conveyor and then transferred to the next adjacent tank. 106 designates a squeegee bar that is pivotally mounted on the support 107 by means of arms 108 and arranged to be swung laterally by the paper gripping device traveling therethrough and engaging the arms 108. The bar 106 effects a slight pressure against one side of the paper and in cooperation with a stationary bar 109, to remove surplus liquid from the surfaces of the paper as it leaves the tank.

While the invention has been described with reference to the details of construction herein shown, it is not limited to this particular embodiment, and this application is intended to cover any modifications or departures that may come within the purposes of the improvement or the scope of the following claims.

I claim:

1. In a mechanism for processing photographic paper, the combination with paper feeding mechanism and processing receptacles, of separate and independently movable paper gripping devices engageable with the forward edge of a paper sheet, one of said paper gripping devices being stationarily positioned in the path of the paper prior to operation of the paper feeding mechanism, and means acting to operate the paper feeding mechanism to feed the paper into engagement with said paper gripping device and thereafter to feed the paper gripping device to the processing receptacles, the paper gripping device being automatically clampingly engaged with the paper sheet during the last mentioned movement.

2. In a mechanism for processing photographic paper, the combination with paper feeding mechanism and processing receptacles, of separate and independently movable paper gripping devices engageable with the forward edge of a paper sheet, said gripping devices being stationary in loading position, means acting to move one of said paper gripping devices from its stationary loading position to initial feeding position in the path of the paper, means acting to operate the paper feeding mechanism to feed the paper into engagement with said gripping device and thereafter to feed the paper gripping device to the processing receptacles, the paper gripping device being automatically clampingly engaged with the paper during the last mentioned movement, and means acting automatically to disengage the paper gripping device from the paper after the latter leaves the processing receptacles and to move the paper gripping device to its stationary loading position.

3. In a mechanism for processing photographic paper, the combination with paper feeding mechanism and processing receptacles, of a separate conveyor in each receptacle, separate and independently movable paper gripping devices engageable with the forward edge of a paper sheet, said paper gripping devices being stationary in loading position, a starting conveyor operable to move one of said paper gripping devices from loading position into initial feeding position, means acting to operate the paper feeding mechanism and thereafter to operate the starting conveyor and move the paper gripping device to the processing receptacles, the paper gripping device being automatically clampingly engaged with the paper during the last mentioned movement, and mechanism operating to move said paper gripping device from the conveyor in one processing receptacle to the conveyor in another processing receptacle.

4. In a mechanism for processing photographic paper, the combination with paper feeding mechanism and processing receptacles, of separate and independently movable paper gripping devices engageable with the forward edge of a paper sheet, said paper gripping devices being selectively positioned in the path of the paper in initial feeding position, means acting to operate the paper feeding mechanism to move the paper into engagement with said paper gripping device and thereafter to move said paper gripping device to the processing receptacles, the paper gripping device being automatically clampingly engaged with the paper during the last mentioned movement, a separate conveyor in each receptacle for carrying the paper gripping device therethrough, and mechanism for moving the paper gripping device from one receptacle conveyor to another.

5. In a mechanism for processing photographic paper, the combination with paper feeding mechanism and processing receptacles, of separate and independently movable paper gripping devices engageable with the forward edge of a paper sheet, means for operating the paper feeding mechanism to feed paper continuously to the processing receptacles, and manually controlled means acting to position one of said paper gripping devices in the path of the paper in initial feeding position and to move it therefrom to said receptacles, the gripping device being clampingly engaged with the paper during the last mentioned movement, a separate conveyor in each receptacle, and means for moving the gripping device automatically from one receptacle conveyor to another 6. In a mechanism for processing photographic paper, the cobinationm with paper feeding mechanism and processing receptacles, of separate and independently movable paper gripping devices engageable with the forward edge of a paper sheet, a separate conveyor in each receptacle, a starting conveyor located between the paper feeding mechanism and the processing receptacles and operable to move one of the paper gripping devices from initial feeding position to the processing receptacles, the paper gripping device being clampingly engaged with the paper during said movement automatically, and means for moving the paper gripping device successively from one receptacle conveyor to another.

7. In a mechanism for processing photographic paper, the combination with paper feeding mechanism, paper cutting mechanism, and processing receptacles, of separate and independently movable paper gripping devices engageable with the forward edge of a paper sheet, said paper gripping devices being stationary in loading position, a separate conveyor in each receptacle, a starting conveyor located between the paper cutting mechanism and the processing receptacles, the starting conveyor being operable to select and move one of said paper gripping devices from its loading position to initial feeding position subsequently to the operation of the paper cutting mechanism, and means for operating the starting conveyor subsequently to the operation of the paper feeding mechanism to move said paper gripping device from initial feeding position to the processing receptacles, the said paper gripping device being automatically clampingly engaged with the forward edge of the paper sheet during the last mentioned movement, and means operating to move said paper gripping device from the conveyor of one receptacle to another.

8. In a mechanism for processing photographic paper, the combination with paper feeding mechanism and paper cutting mechanism operable to cut the paper into any required lengths, processing receptacles, a separate conveyor in each receptacle, a starting conveyor between the paper cutting mechanism and the processing receptacles, of separate and independently movable paper gripping devices engageable with the forward edge of a paper sheet, said paper gripping devices being stationary in loading position and one of said paper gripping devices being located in the path of the paper prior to operation of the paper feeding mechanism, means for operating the starting conveyor subsequently to operation of the paper feeding mechanism to move said paper gripping device from the initial feeding position to the processing receptacles, and means for moving the paper gripping device from one receptacle conveyor to another, said starting conveyor being operable automatically upon operation of the paper cutting mechanism to move a paper gripping device from loading position to initial feeding position to receive another sheet, irrespective of the length of the previously fed sheet of paper.

9. In a mechanism for processing photographic paper, the combination with paper feeding mechanism and processing receptacles, of separate and independently movable paper gripping devices engageable with the forward edge of a paper sheet, one of said paper gripping devices being positioned in the path of the paper prior to operation of the paper feeding mechanism, means acting to operate the paper feeding mechanism to feed the paper and to move the paper gripping device to the processing receptacles, and means effecting clamping engagement of the paper gripping device with the paper.

10. In a mechanism for processing photographic paper, the combination with paper feeding mechanism and processing receptacles, of separate and independently movable paper gripping devices engageable with the forward edge of a paper sheet, one of said paper gripping devices being positioned in the path of the paper prior to operation of the paper feeding mechanism, means acting to operate the paper feeding mechanism to feed the paper and to move the paper gripping device to the processing receptacles, the paper gripping device being automatically engaged with the paper during the last mentioned movement, and means acting automatically to disengage the paper gripping device from the paper after the latter leaves the processing receptacles.

11. In a mechanism for processing photographic paper, the combination with paper feeding mechanism and processing receptacles, of separate and independently movable paper gripping devices engageable with the forward edge of a paper sheet, said paper gripping devices being stationary in loading position, a starting conveyor operable to move one of said paper gripping devices from loading position into initial feeding position, and means acting to operate the paper feeding mechanism and thereafter to operate the starting conveyor and move the said paper gripping device from initial feeding position to the processing receptacles, the paper gripping device being automatically clampingly engaged with the paper during the last mentioned movement.

12. In a mechanism for processing photographic paper, the combination with paper feeding mechanism and processing receptacles, of separate and independently movable paper gripping devices engageable with the forward edge of a paper sheet, said paper gripping devices being selectively positioned in the path of the paper in initial feeding position, and means acting to operate the paper feeding mechanism to feed the paper into engagement with said paper gripping device and thereafter to move said paper gripping device to the processing receptacles, the paper gripping device being automatically clampingly engaged with the paper during the last mentioned movement.

13. In a mechanism for processing photographic paper, the combination with paper feeding mechanism and paper cutting mechanism operable to cut the paper into any required lengths, processing receptacles, a separate conveyor in each receptacle, of separate and independently movable paper gripping devices engageable with the forward edge of a paper sheet, one of said paper gripping devices being located in the path of the paper prior to operation of the paper feeding mechanism, means acting to operate the paper feeding mechanism and to move said paper gripping device from its initial feeding position to the processing receptacles, means for moving the paper gripping device from one receptacle conveyor to another, and means acting automatically upon operation of the paper cutting mechanism to move a paper gripping device into initial feeding position to receive another sheet.

14. In a mechanism for processing photographic paper, the combination with paper feeding mechanism and paper cutting mechanism operable to cut the paper into any required lengths, processing receptacles, of separate and independently movable paper gripping devices engageable with the forward edge of a paper sheet, said paper gripping devices being stationary in loading position and one of said paper gripping devices being located in the path of the paper prior to operation of the paper feeding mechanism, means for operating the paper feeding mechanism and moving the paper gripping device from initial feeding position to the processing receptacles, and means acting automatically upon operation of the paper cutting mechanism to move a paper gripping device from loading position to initial feeding position to receive another sheet.

15. In a mechanism for processing photographic paper, the combination with paper feeding mechanism operating to feed a continuous sheet of paper, paper cutting mechanism, processing receptacles, a separate conveyor in each receptacle, of separate and independently movable paper gripping devices engageable with the forward edge of a paper sheet, one of said paper gripping devices being located in the path of the paper prior to operation of the paper feeding mechanism, means for operating the paper feeding mechanism and thereafter moving said paper gripping device to the processing receptacles, the paper gripping device being automatically clampingly engaged with the paper during the last mentioned movement, means for moving the paper gripping device from one receptacle conveyor to another, and means for operating the paper cutting mechanism and thereafter automatically moving a paper gripping device into initial feeding position ready to receive another sheet of paper.

16. In a mechanism for processing photographic paper, the combination with paper feeding mechanism, paper cutting mechanism, processing receptacles, a starting conveyor between the paper cutting mechanism and the processing receptacles, of separate and independently movable paper gripping devices engageable with the forward edge of a paper sheet, said paper gripping devices being stationary in loading position and said starting conveyor operating to move a paper gripping device from loading position to initial feeding position upon operation of the cutting mechanism and to move said paper gripping device from initial feeding position to the processing receptacles upon operation of the paper feeding mechanism, the paper gripping device being clampingly engaged with the paper sheet before entering the processing receptacles and disengaged therefrom after leaving the receptacles.

17. In a mechanism for processing photographic paper, the combination with paper feeding mechanism, processing receptacles, a starting conveyor, of separate and independently movable paper gripping devices engageable with the forward edge of a paper sheet, said paper gripping devices being stationary in loading position, and one of said paper gripping devices being located in the path of the paper prior to operation of the paper feeding mechanism, the starting conveyor acting to move said paper gripping device from loading position to initial feeding position, and means for operating the starting conveyor upon movement of the paper feeding mechanism to move said paper gripping device from initial feeding position to the processing receptacle, the paper gripping device being clampingly engaged with the paper during the last mentioned movement.

18. In a mechanism for processing photographic paper, the combination with a plurality of processing receptacles, a separate conveyor in each receptacle, of separate and independently movable paper gripping devices engageable with the forward edge of a paper sheet, means for clampingly engaging one of said paper gripping devices with the sheet, and means for feeding said paper gripping device successively through said receptacles from one receptacle conveyor to another.

19. In a mechanism for processing photographic paper, the combination with paper feeding mechanism and processing receptacles, of a separate conveyor in each receptacle, a supporting unit for each of said conveyors removably arranged in its receptacle, drive mechanism for the several conveyors, separate and independently movable paper gripping devices engageable with the forward edge of a paper sheet, one of said paper gripping devices being positioned in the path of the paper prior to operation of the paper feeding mechanism, and means acting to operate the paper feeding mechanism to feed the paper into engagement with said paper gripping device and thereafter to feed the paper gripping device successively to the conveyors of the different processing receptacles, the paper gripping device being automatically clampingly engaged with the paper sheet before reaching the first receptacle and disengaged therefrom after leaving the last receptacle.

20. In a mechanism for processing photographic paper, the combination with paper feeding mechanism and processing receptacles, of separate and independently movable paper gripping devices engageable with the forward edge of a paper sheet, one of said paper gripping devices being positioned in the path of the paper prior to operation of the paper feeding mechanism, and means acting to operate the paper feeding mechanism to feed the paper into engagement with said paper gripping device and thereafter to feed the paper gripping device to the processing receptacles, said paper gripping device including a supporting bar, pairs of clamping plates disposed at opposite ends of the bar, the clamping plates of each pair being located on opposite sides of the bar and having cooperating gripping portions, said plates being movably supported on the bar by means of pins extending through openings in the plates and a cam slot in the bar, the bar having a camming action on the plates when the latter are moved laterally, the clamping plates being movable laterally of the bar by said cam slot and pins when the clamping plates are moved endwise of the bar to effect closing or separation of the gripping portions of the clamping plates, and means located in the path of travel of the paper gripping device for engaging said pins and effecting endwise movement of the clamping plates.

21. In a mechanism for processing photographic paper, the combination with paper feeding mechanism and processing receptacles, of separate and independently movable paper gripping devices engageable with the forward edge of a paper sheet, one of said paper gripping devices being positioned in the path of the paper prior to operation of the paper feeding mechanism, and means acting to operate the paper feeding mechanism to feed the paper into engagement with said paper gripping device and thereafter to feed the paper gripping device to the processing receptacles, said paper gripping device including a supporting bar, a pair of clamping plates arranged on opposite sides of the bar, said clamping plates having cooperating gripping portions and movably supported on the bar by means of pins extending through openings in the plates and a cam slot in the bar, the clamping plates being moved laterally of the bar by said cam slot and pins when the clamping plates are moved endwise of the bar to effect closing or opening of the gripping portions of the clamping plates, and means located in the path of travel of the paper gripping device for engaging said pins and effecting movement of the clamping plates on the bar.

22. In a mechanism for processing photographic paper, the combination with paper feeding mechanism and processing receptacles, of separate and independently movable paper gripping devices engageable with the forward edge of a paper sheet, one of said paper gripping devices being positioned in the path of the paper prior to operation of the paper feeding mechanism, and means acting to operate the paper feeding mechanism to feed the paper into engagement with said paper gripping device and thereafter to feed the paper gripping device to the processing receptacles, said paper gripping device including a supporting bar, pairs of clamping plates disposed at opposite ends of the bar, the clamping plates of each pair being located on opposite sides of the bar and having cooperating gripping portions, said plates being movably supported on the bar by means of pins extending through openings in the plates and a cam slot in the bar, the bar having a camming action on the plates when the latter are moved laterally and the clamping plates being movable laterally of the bar by said cam slot and pins when the clamping plates are moved endwise of the bar to effect closing or separation of the gripping portions of the clamping plates, said cam slot having a straight portion terminating in a curved portion at each end, means located in the path of travel of the paper gripping device for engaging said pins and effecting partial endwise movement of the clamping plates to grip the paper before reaching the processing receptacles, means located in the path of said pins in the first processing receptacle for effecting further endwise movement of the clamping plates while still gripping the paper in order to draw the paper laterally and compensate for its stretching when wet, and means located in the path of said pins for effecting further endwise movement of the plates to the ends of said cam slots to release the clamping plates from the paper after it leaves the processing receptacles.

23. In a mechanism for processing photographic paper, the combination with paper feeding mechanism and processing receptacles, of separate and independently movable paper gripping devices engageable with the forward edge of a paper sheet, one of said paper gripping devices being positioned in the path of the paper prior to operation of the paper feeding mechanism, and means acting to operate the paper feeding mechanism to feed the paper into engagement with said paper gripping device and thereafter to feed the paper gripping device to the processing receptacles, said paper gripping device including a supporting bar, a pair of clamping plates arranged on the bar and having cooperating paper gripping portions, and means located in the path of travel of the paper gripping device for controlling said plates and effecting movement of said paper gripping portions toward or from each other.

24. In a mechanism for processing photographic paper, the combination with paper feeding mechanism and processing receptacles, of separate and independently movable paper gripping devices engageable with the forward edge of a paper sheet, one of said paper gripping devices being positioned in the path of the paper prior to operation of the paper feeding mechanism, and means acting to operate the paper feeding mechanism to feed the paper into engagement with said paper gripping device and thereafter to feed the paper gripping device to the processing receptacles, said paper gripping device including a supporting bar, pairs of clamping plates disposed at opposite ends of the bar, the clamping plates of each pair being located on opposite sides of the bar and having cooperating gripping portions, pins carried by the clamping plates, and means located in the path of travel of the paper gripping device for engaging said pins and effecting movement of said paper gripping portions toward or from each other.

25. In a mechanism for processing photographic paper, the combination with paper feeding mechanism and processing receptacles, of separate and independently movable paper gripping devices engageable with the forward edge of a paper sheet, one of said paper gripping devices being positioned in the path of the paper prior to operation of the paper feeding mechanism, and means acting to operate the paper feeding mechanism to feed the paper into engagement with said paper gripping device and thereafter to feed the paper gripping device to the processing receptacles, said paper gripping device including a supporting bar, pairs of clamping plates disposed at opposite ends of the bar, the clamping plates of each pair having cooperating gripping portions and movable on the bar endwise thereof, pins carried by the clamping plates, and means located in the path of travel of the paper gripping device for engaging said pins and effecting endwise and clamping movement of the plates before reaching the processing receptacles, means located in the path of said pins in the first processing receptacle for effecting further endwise movement of the clamping plates while their gripping portions remain engaged with the paper in order to draw the paper laterally and compensate for its stretching when wet, and means located in the path of travel of said paper gripping device for effecting further endwise movement of the plates to release the paper after the paper gripping device leaves the processing receptacles.

26. In a mechanism for processing photographic paper, the combination with paper feeding mechanism and processing receptacles, of separate and independently movable paper gripping devices engageable with the forward edge of a paper sheet, one of said paper gripping devices being positioned in the path of the paper prior to operation of the paper feeding mechanism, and means acting to operate the paper feeding mechanism to feed the paper into engagement with said paper gripping device and thereafter to feed the paper gripping device to the processing receptacles, said paper gripping device including a supporting bar, pairs of clamping plates disposed at opposite ends of the bar, the clamping plates of each pair having cooperating gripping portions, means located in the path of the paper gripping device acting to effect clamping engagement of said plates with the paper before reaching the processing receptacles, means located in the first processing receptacle in the path of said paper gripping device acting to move the two pairs of clamping plates away from each other while clampingly engaged with the paper to draw the latter and compensate for its stretching when wet, and means located in the path of said paper gripping device acting to disengage the clamping plates from the paper after they leave the processing receptacles.

27. In a mechanism for processing photographic paper, the combination with paper feeding mechanism and processing receptacles, of separate and independently movable paper gripping devices engageable with the forward edge of a paper sheet, one of said paper gripping devices being positioned in the path of the paper prior to operation of the paper feeding mechanism, and means acting to operate the paper feeding mechanism to feed the paper into engagement with said paper gripping device and thereafter to feed the paper gripping device to the processing receptacles, said paper gripping device including a supporting bar, a pair of clamping plates located on opposite sides of the bar and having inwardly inclined gripping portions and inwardly inclined rear portions, said plates being movably supported on the bar by means of pins extending through openings in the plates and a cam slot in the bar, the bar engaging said rear portions of the plates and moving said gripping portions together when the plates are moved laterally of the bar, and means located in the path of travel of the paper gripping device for engaging the pins and effecting endwise movement of the clamping plates.

28. In a mechanism for processing photographic paper, the combination with paper feeding mechanism and processing receptacles, of separate and independently movable paper gripping devices engageable with the forward edge of a paper sheet, one of said paper gripping devices being positioned in the path of the paper prior to operation of the paper feeding mechanism, and means acting to operate the paper feeding mechanism to feed the paper into engagement with said paper gripping device and thereafter to feed the paper gripping device to the processing receptacles, said paper gripping device including a supporting bar, pairs of clamping plates disposed at opposite ends of the bar, the clamping plates of each pair being located on opposite sides of the bar and having inwardly inclined gripping portions and inwardly inclined rear portions, said plates being movably supported on the bar by means of pins extending through openings in the plates and cam slots in the bar, the bar acting to engage said rear portions of the plates and to force the gripping portions toward each other when the plates are moved laterally of the bar, said cam slot having a straight portion and a curved portion at each end thereof to effect the necessary lateral movement of the clamping plates for opening and closing the same and the straight portion of the cam slot permitting the clamping plates to be moved endwise of the bar for a distance while remaining in clamping relation with the paper, and means located in the path of travel of the paper gripping device for engaging said pins and effecting endwise movement of the clamping plates to open and close the same.

29. In a mechanism for processing photographic paper, the combination with paper feeding mechanism and processing receptacles, of a separate conveyor in each receptacle, a support for the conveyor removably arranged in the receptacle, a driven shaft for the conveyor mounted in said support, a driving shaft, removable means for locking said driving shaft to said driven shaft, separate and independently movable paper gripping devices engageable with the forward edge of a paper sheet, one of said paper gripping devices being stationarily positioned in the path of the paper prior to operation of the paper feeding mechanism, means acting to operate the paper feeding mechanism to feed the paper into engagement with said paper gripping device, and thereafter to feed the paper gripping device to the processing receptacles, the paper gripping device being automatically clampingly engaged with the paper sheet before reaching the processing receptacles, and means for moving the paper gripping device from the conveyor of one receptacle to the conveyor of another receptacle.

30. In a mechanism for processing photographic paper, the combination with paper feeding mechanism and processing receptacles, of separate and independently movable paper gripping devices engageable with the forward edge of a paper sheet, said paper gripping devices being stationary in loading position, one of said paper gripping devices being positioned in the path of the paper prior to operation of the paper feeding mechanism, means acting to operate the paper feeding mechanism to feed the paper into engagement with said paper gripping device and thereafter to feed the paper gripping device to the processing receptacles, the paper gripping device being automatically clampingly engaged with the paper sheet before reaching the processing receptacles and disengaged therefrom after leaving the processing receptacles, and means acting to return the paper gripping device to loading position after it is released from the paper.

31. In a mechanism for processing photographic paper, the combination with paper feeding mechanism and processing receptacles, of separate and independently movable paper gripping devices engageable with the forward edge of a paper sheet, said paper gripping devices being stationary in loading position, one of said paper gripping devices being positioned in the path of the paper prior to operation of the paper feeding mechanism, means acting to operate the paper feeding mechanism to feed the paper into engagement with said paper gripping device and thereafter to feed the paper gripping device to the processing receptacles, the paper gripping device being automatically clampingly engaged with the paper sheet before reaching the processing receptacles and disengaged therefrom after leaving the processing receptacles, means acting to return the paper gripping device to loading position after it is released from the paper, a drier mechanism including a conveyor belt, and feeding mechanism controlled by said paper gripping device and operating after the latter is released from the paper to engage the paper as it enters said conveyor belt and to insure its proper movement to the drying mechanism.

32. In a mechanism for processing photographic paper, the combination with paper feeding mechanism and processing receptacles, of separate and independently movable paper gripping devices engageable with the forward edge of a paper sheet, said paper gripping devices being stationary in loading position, one of said paper gripping devices being positioned in the path of the paper prior to operation of the paper feeding mechanism, means acting to operate the paper feeding mechanism to feed the paper into engagement with said paper gripping device and thereafter to feed the paper gripping device to the processing receptacles, the paper gripping device being automatically clampingly engaged with the paper sheet before reaching the processing receptacles and disengaged therefrom after leaving the processing receptacles, means acting to return the paper gripping device to loading position after it is released from the paper, paper drying mechanism including a conveyor belt, and a rotatable friction feed member that is engageable with the paper to assist in moving the latter on to said belt after the paper gripping device has been released, said rotatable friction feed member being normally idle and set in operation by the paper gripping device as the latter is released from the paper.

WHITTEN P. LLOYD.